April 30, 1940.   I. B. LAWYER   2,198,703
INJECTION CHAMBER WITH FLUID HEAT TRANSFER MEDIUM
Filed Sept. 26, 1938   2 Sheets-Sheet 1
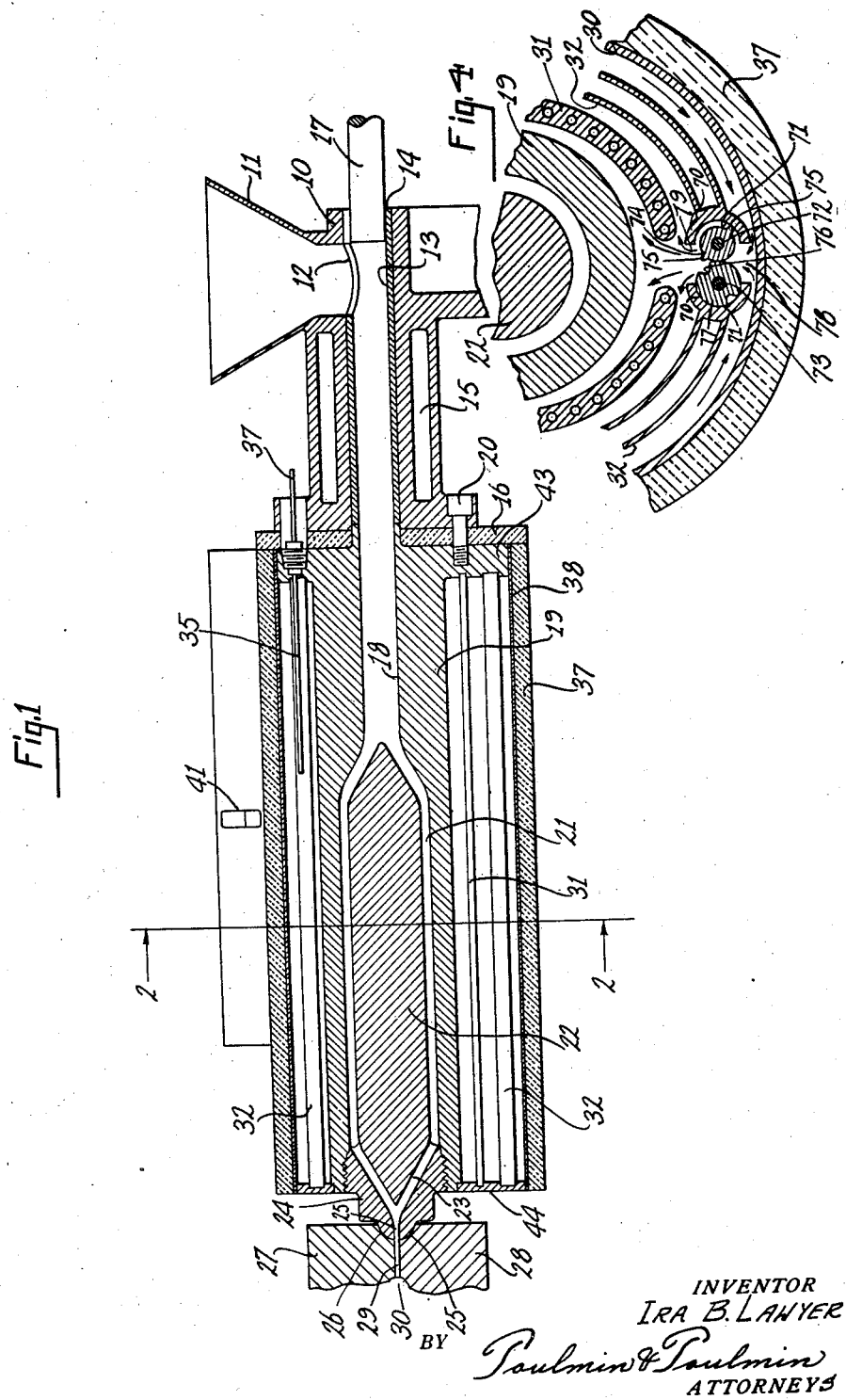
INVENTOR
IRA B. LAWYER
BY Poulmin & Poulmin
ATTORNEYS

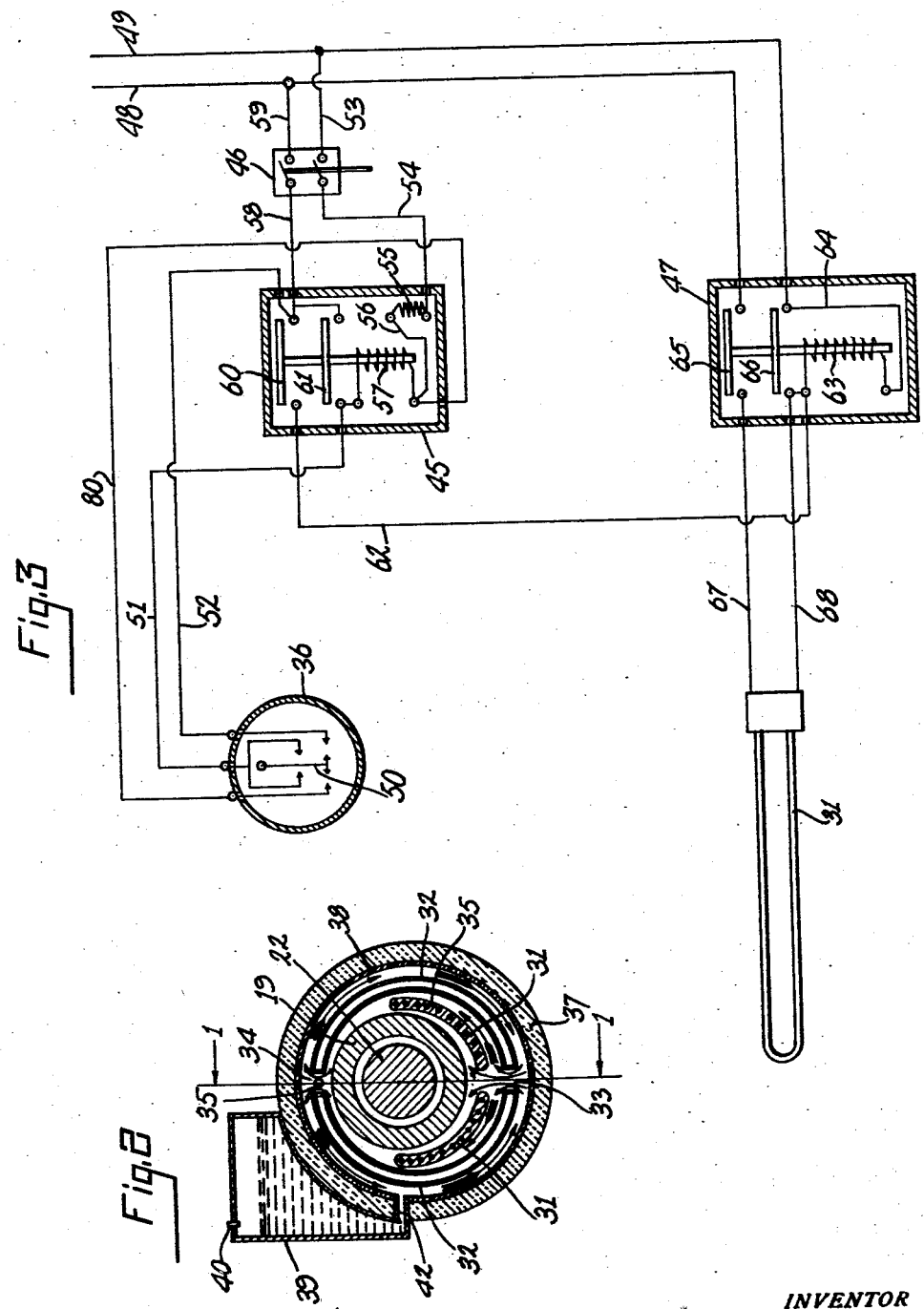

Patented Apr. 30, 1940

2,198,703

UNITED STATES PATENT OFFICE 2,198,703

INJECTION CHAMBER WITH FLUID HEAT TRANSFER MEDIUM

Ira B. Lawyer, Mount Gilead, Ohio, assignor to The Hydraulic Development Corporation, Inc., Wilmington, Del., a corporation of Delaware Application September 26, 1938, Serial No. 231,637

17 Claims. (Cl. 219—39)

This invention relates to plastic injection moulding machines and, in particular, to devices for injecting the plastic moulding material into the moulds.

One object of this invention is to provide an injection chamber with a heating device and a fluid medium for transferring the heat from the heating device to the chamber walls.

Another object is to provide an injection chamber having means for circulating a fluid heat transferring medium therearound and baffle devices for facilitating the circulation of the medium within the chamber.

Another object is to provide an injection chamber having a heating device within the chamber and a fluid heat transfer medium circulating between the heating device and the chamber walls.

Another object is to provide an injection chamber, as described above, wherein the heating of the heating device is controlled in response to the action of a control instrument having a portion thereof inserted in the fluid medium.

Another object is to provide an injection chamber of the type described above, having means associated therewith for assisting the circulation of the fluid medium.

In the drawings:

Figure 1 is a vertical longitudinal section through the injection device of this invention;

Figure 2 is a cross section along the line 2—2 in Figure 1;

Figure 3 is a wiring diagram of the electrical circuit for controlling the heating device; and Figure 4 is an enlarged cross section similar to a portion of Figure 2, but showing a modification wherein means is provided for forcibly circulating the heat-transmitting fluid.

Hitherto, in plastic injection moulding, the heating of the material to be injected had to be accomplished in a very accurate manner in order to render it plastic. Any appreciable variation from the heating condition desired resulted in disturbances in the moulding cycle and consequently resulted in the production of defective moulded articles.

If the plastic material is heated to too high a degree, the material becomes excessively plastic so that, when it is injected into the mould, it causes the mould halves to separate, thereby producing a film of plastic material on the article at the parting line of the moulds of the mould halves, this defect being known as "flash" to persons in the moulding art. If, on the other hand, the mould material is not heated sufficiently to render it suitably plastic, the material may be insufficiently plastic to fill the mould halves properly, especially if the mould contains a cavity with intricate portions therein.

Hitherto, when an electrical heating element was used to heat the injection chamber, it was usually applied directly around the heating chamber and in contact with it. With this arrangement, however, the heating intensity varies at different points because the heating element produces a high degree of heat at the element, but has no adequate provision for distributing the heat. It has also been found, moreover, that the exact temperature in this arrangement cannot be easily determined by instruments, because a time lag occurs between the arrival of the chamber at a certain temperature and the action of the heat indicating instrument. Even where the sensitive element of the instrument has been inserted in a cavity in the chamber wall, or in the body of the element, a variation between the actual temperature of the chamber and the temperature of the element has been found to occur.

With the heating controlled in accordance with the temperature of the instrument therefor, the temperature controlled has not been in agreement with the actual temperature existing so that the plastic material becomes more plastic than is desired before the control instrument cuts off the heat, thereby producing the "flash" previously mentioned. On the other hand, after the heat has been cut off or reduced and the plastic material in the chamber cools, it is likely to cool to an undesired amount before the control instrument again turns on the heat, thereby producing inadequate filling of the mould.

Hitherto, when the injection chamber was heated by circulating a heated fluid medium through a heating jacket around the injection chamber, the fluid medium was heated in a separate container and circulated by means of a pump.

In this arrangement, heating was regulated by a control instrument, the sensitive bulb of which was inserted in the fluid stream. This arrangement, however, requires considerable equipment including the piping and the pump and is less efficient because of the heat lost in the circulating system. The additional expense incident to the maintenance of the additional equipment required and the additional cost thereof is also a detriment.

The present invention combines the advantages of a heating device directly adjacent the chamber walls and a fluid medium to conduct the heat from the heating device to the chamber walls. The sensitive bulb of the control instrument is inserted in this fluid medium and gives an accurate measurement and control of the temperature actually existing at the chamber walls. Baffles are provided to facilitate the circulation of the fluid medium so as to obtain the utmost advantage and efficiency from the convection currents set up in the fluid.

Referring to the drawings in detail, Figure 1 shows a casing 10 having a hopper 11 with an orifice 12 opening into a bore 13 within a sleeve 14. The casing 10 also contains a jacket or annular chamber 15 for the circulation of a cooling fluid. This is for the purpose of preventing premature melting of the moulding material. An insulation layer 16 is provided at the end of the casing 10 to prevent the transmission of heat into the casing 10. The moulding material to be rendered plastic is placed in the hopper 11 and falls into the bore 13 through the aperture 12, from whence it is injected by means of the movable plunger 17 into the heating chamber 18 within the heating casing 19. The latter is secured to the casing 10 by the screws 20, being separated therefrom by the insulating partition 16 previously mentioned.

The chamber 18 is enlarged as at 21 and is there provided with a spreader 22 for causing the plastic material to traverse an annular path through the chamber portion 21. Beyond this, the material passes through the diagonally directed passages 23 in the nozzle 24. These passages unite in the common passage 25 at the rounded tip 26 of the nozzle 24. The rounded tip 26 engages a correspondingly rounded depression 25 between the mould halves 27 and 28 and communicates with the passage 29 leading into the mould cavity 30.

Arranged adjacent and immediately outside the heating casing 19 are heating elements 31, preferably electrical heating elements. These heating elements 31 are shown as arranged in partially cylindrical form so as to closely approach the outer surface of the heating casing 19. Beyond and outside of the heating elements 31 are semi-cylindrical baffles 32 having lower and upper passageways 33 and 34 therebetween (Figure 2).

Inserted in the upper passageway 34, between the baffles 32, is the sensitive bulb 35 of a control instrument generally designated 36 and communicating therewith by the tube 37 (Figure 1). Surrounding the baffles 32 and spaced apart therefrom is an outer casing 38, around which is a heat insulation layer 37. Arranged adjacent the device is an expansion tank 39 having a vent 40 therein and a fluid gauge window 41 for indicating the level of fluid in the expansion tank 39. A passageway 42 runs from the expansion tank 39 to the interior of the outer casing 38. The righthand end of the chamber is closed by the flanged portion 43 and the lefthand end by the annular end wall 44. The baffles 32 are preferably hollow so as to provide a dead air space therein for impeding the transfer of heat therethrough.

The electrical circuit (Figure 3) consists of an indicating thermostat which is the control instrument 36 previously referred to, a relay 45, a control switch 46, and a contactor 47. The exact arrangement of the heating circuit, however, is immaterial to the purposes of the invention and may be of any desired type. Current for heating the heating elements 31 is received from the power lines 48 and 49, the same current being employed for operating the control circuit.

The operation of the electrical circuit is described subsequently in more detail.

In the operation of the invention, assuming that the fluid is in a state of rest, electricity is supplied to the heating elements 31, whereupon the fluid immediately adjacent the heating element 31 becomes heated and expands and rises to the top of the chamber through the passageways between the baffles 32 and the chamber 19. The heavier cold fluid in the outer space outside the baffles 32 displaces the rising heated fluid and passes through the passageway 33 between the baffles into the space previously occupied by the now heated fluid. The latter passes upwardly through the upper passageway 34, having lost some of its heat, depending upon the amount of cold material that is being introduced into the bore 18. Thus, a circulation by convection currents is established upwardly through the space between the chamber walls 19 and the baffles 32 and downwardly outside these baffles as indicated by the arrows in Figure 2. Even though the fluid cools slightly in rising around the injector chamber walls 19, it is forced upwardly by the rising cooler fluid coming through the lower passageway 33.

The baffles 32, as previously stated, prevent the mixture of the currents of heat-transmitting fluid and also prevent heat transfer between the outer and inner spaces, which would tend to hinder the movement of the fluid. So long as heat is being absorbed by the material in the bore 18 and chamber 21 as fast as it is being given off by the heating elements 31, the temperature of the heat-transmitting medium, such as steel, does not rise and hence the sensitive bulb 35 of the control instrument 36 does not operate the latter to cut off the heat. As soon as the temperature rises past the critical point, such as when less heat is absorbed by the plastic material than is given off by the heating element, the temperature rises until it exceeds the setting of the control instrument 36, whereupon the latter is actuated in response to the temperature of the sensitive bulb 35 and reduces or cuts off the supply of current to the heating elements 31.

As soon as the temperature of the heat-transmitting fluid or oil drops below a predetermined temperature, however, the control instrument 36 operates to close the heating circuit again so that the heating elements 31 resume their heating function. Thus, in this manner, the fluid transmits the heat from the heating elements in an even manner to the walls of the heating chamber and an accurate temperature is transmitted to the sensitive bulb 35 of the control instrument 36.

The baffles 32 guide the heated fluid upwardly past the outer walls of the heating casing 19 and then downwardly in the outer space adjacent the outer casing 38. Any additional fluid required is immediately received through the passageway 42 from the expansion tank 39, and any excess fluid passes outwardly through passageway 42 into the tank 39.

In the electrical operation, the thermostatically movable switch member 50 moves to the right upon a fall in temperature and moves to the left upon a rise in temperature. When the temperature falls below the predetermined low temperature, the thermostatic switch element 50 interconnects the lines 51 and 52, thereby closing the circuit by way of the line 53, the switch 46, the line 54, coil 55, the line 56, the operating coil 57 of the relay 45, the line 51, the line 52, the line 58, the switch 46, the line 59, and the power line 48. When thus energized, the relay 45 closes, and its upper and lower switch blades 60 and 61 close upon their contacts. The upper switch blade 60, when thus closed, likewise closes the circuit from the power line 48, through the line 59, the switch 46, the line 58, the switch blade 60, the line 62, the operating coil 63 of the contactor 47 and the line 64 leading to the power line 49.

When thus energized, the contactor 47 closes, and its switch blades 65 and 66 close upon their contacts. This closes the circuit for energizing the heating elements 31 from the line 48 through the switch blade 65, the line 67, the heating element 31, the line 68, and the switch blade 66 to the power line 49, completing the circuit. When the temperature rises, the thermostatic switch element 50 of the control instrument 36 moves to the left.

While the relay 45 remains closed, the lower switch blade 61 maintains the energization of the operating coil 57 without the necessity of the current passing through the sensitive control instrument 36, the circuit being completed from the power line 49 through the line 53, the switch 46, the line 54, the coil 55, the line 56, the operating coil 57, the switch blade 61, the line 58, the switch 46 and the line 59 to the power line 48.

When the desired temperature has been exceeded the thermostatic switch element 50 moves to the left. Coil 57 still remains energized. As soon however as contact is established between lines 51 and line 80, a circuit is set up through 59, 58, switch blade 61, line 51, switch element 50, thence through line 80, line 56, through 55, 54, and 53 to line 49. This shorts out the coil 57 with the result that switch blades 61 and 60 open, thus de-energizing the pilot circuit and hence the heater circuit. 55 is a resistor to prevent an excessive current from rushing through the lines with damaging results. Without resistor 55 there would be a dead short through the circuit just described.

The fact that the thermostatic switch element moves very slowly instead of with the quick make and break action ordinarily built into switches makes necessary the foregoing arrangement. Quick make and break is to prevent arcing which is damaging to the contacts. Arcing occurs when breaking a circuit, but in the present arrangement it will be noted that at no time is a line circuit broken when 50 moves.

The modification shown in Figure 4 is similar to the form of the invention shown in Figure 2, except that forcible circulation of the fluid is provided and convection currents need not be depended upon for the entire circulating effect. In this modification, the ends of the baffles 32 are provided with semi-cylindrical portions 70 having cavities 71 facing one another to provide a housing for a pair of shafts 72 and 73 running longitudinally through the apparatus.

Mounted on the shaft 72 is a rotary piston 74 having projecting ridges 75 arranged to mesh with corresponding grooves 76 in an elongated drum 77 mounted upon the shaft 73. The shafts 72 and 73 are interconnected by external gearing (not shown) and driven so as to provide forcible pumping of the fluid vertically through the spaces 78 and 79 between the oppositely facing members 70.

If the piston member 74 and shaft 72 rotates in a counterclockwise direction, the fluid is circulated in the direction of the arrows from the space outside the baffles 32 into the space inside the baffles and on opposite sides of the heating elements 31.

It will be evident that the grooved drum 77 may be omitted and the rotary piston 74, 75 be caused to fill most of the space within the oppositely facing cavities 71 so as to provide a simple impeller at a somewhat lower efficiency than the pumping device illustrated in Figure 4.

Having thus fully described my invention what I claim as new and desire to secure by Letters Patent is:

1. In an injection device for plastic injection moulding machines, an injector casing, a heating element outside said casing, an outer casing outside said heating element, means for circulating a heat-transmitting fluid through the space between said casings, and baffles within said space for guiding the circulating fluid.

2. In an injection device for plastic injection moulding machines, an injector casing, a heating element outside said casing, an outer casing outside said heating element, means for circulating a heat-transmitting fluid through the space between said casings, and baffles arranged between said heating element and said outer casing for guiding the circulating fluid.

3. In an injection device for plastic injection moulding machines, an injector casing, a heating element outside said casing, an outer casing outside said heating element, means for circulating a heat-transmitting fluid through the space between said casings, and baffles arranged between said heating element and said outer casing for guiding the circulating fluid, said baffles being of heat insulating construction.

4. In an injection device for plastic injection moulding machines, an injector casing, a heating element outside said casing, an outer casing outside said heating element, means for circulating a heat-transmitting fluid through the space between said casings, and baffles arranged between said heating element and said outer casing for guiding the circulating fluid, said baffles having hollow chambers therein for impeding the transmission of heat therethrough.

5. In an injection device for plastic injection moulding machine, an injector casing, a heating element outside said casing, an outer casing outside said heating element, means for circulating a heat-transmitting fluid through the space between said casings, baffles within said space for guiding the circulating fluid, and control means responsive to the fall of temperature within said space below a predetermined minimum temperature for energizing said heating element.

6. In an injection device for plastic injection moulding machines, an injector casing, a heating element outside said casing, an outer casing outside said heating element, means for circulating a heat-transmitting fluid through the space between said casings, baffles within said space for guiding the circulating fluid, and control means responsive to the fall of temperature within said space below a predetermined minimum temperature for energizing said heating element and responsive to a rise of temperature in said space above a predetermined maximum temperature for de-energizing said heating element.

7. In an injection device for plastic injection moulding machines, an injector casing, a heating element outside said casing, an outer casing outside said heating element, means for circulating a heat-transmitting fluid through the space between said casings, and a fluid supply reservoir immediately adjacent said outer casing.

8. In a heating device for plastic injection moulding machines, a tubular heating casing, a tubular outer casing surrounding said heating casing and spaced apart therefrom, a heating element in the space between said casings, a fluid medium in said space for transmitting the heat from said heating element to said heating casing, and baffle means arranged in said space for directing the circulation of said fluid medium.

9. In a heating device for plastic injection moulding machines, a tubular heating casing, a tubular outer casing surrounding said heating casing and spaced apart therefrom, a heating element in the space between said casings, a fluid medium in said space for transmitting the heat from said heating element to said heating casing, and a curved baffle arranged in said space between said casings for directing the circulation of said fluid medium.

10. In a heating device for plastic injection moulding machines, a tubular heating casing, a tubular outer casing surrounding said heating casing and spaced apart therefrom, a heating element in the space between said casings, a fluid medium in said space for transmitting the heat from said heating element to said heating casing, and a curved baffle arranged in said space between said casings and outside said heating element for directing the circulation of said fluid medium.

11. In a heating device for plastic injection moulding machines, a tubular heating casing, a tubular outer casing surrounding said heating casing and spaced apart therefrom, a heating element in the space between said casings, a fluid medium in said space for transmitting the heat from said heating element to said heating casing, and a curved baffle arranged in said space between said casings and outside said heating element for directing the circulation of said fluid medium, said baffle extending substantially from the bottom to the top of said space and dividing said space into outer and inner chambers for facilitating the circulation of cold and hot fluid respectively.

12. In a heating device for plastic injection moulding machines, a heating casing, an outer casing surrounding said heating casing and spaced apart therefrom, a heating element in the space between said casings, a fluid medium in said space for transmitting the heat from said heating element to said heating casing, and means for forcibly circulating the fluid through said space.

13. In a heating device for plastic injection moulding machines, a heating casing, an outer casing surrounding said heating casing and spaced apart therefrom, a heating element in the space between said casings, a fluid medium in said space for transmitting the heat from said heating element to said heating casing, and a pair of spaced semi-cylindrical baffles disposed on opposite sides of said heating chamber.

14. In a heating device for plastic injection moulding machines, a heating casing, an outer casing surrounding said heating casing and spaced apart therefrom, a heating element in the space between said casings, a fluid medium in said space for transmitting the heat from said heating element to said heating casing, and a pair of spaced semi-cylindrical baffles disposed on opposite sides of said heating chamber and between said heating element and said outer casing.

15. In an injection device for plastic injection moulding machines, an injector chamber, an injector plunger therein, a heating casing having a heating chamber in communication with said injector chamber, an outer casing surrounding said heating casing, a heating element in the space between said casings, a fluid heat-transmitting medium in said space, and pumping means within said heating casing for forcibly circulating said fluid heat-transmitting medium through said space.

16. In an injection device for plastic injection moulding machines, an injector casing, a heating element outside said casing, an outer casing outside said heating element, means for circulating a heat-transmitting fluid through the space between said casings, baffles within said space for guiding the circulating fluid, and pumping means within said outer casing for forcibly circulating said heat-transmitting fluid through said space.

17. In an injection device for plastic injection moulding machines, an injector chamber, an injector plunger therein, a heating casing having a heating chamber in communication with said injector chamber, an outer casing surrounding said heating casing, a heating element in the space between said casings, a fluid heat-transmitting medium in said space, and pumping means immediately adjacent one of said casings for forcibly circulating said fluid heat-transmitting medium through said space.

IRA B. LAWYER.